W. L. DAVIS.
VARIABLE LEAD VALVE GEAR FOR LOCOMOTIVES.
APPLICATION FILED FEB. 12, 1910.
977,938.
Patented Dec. 6, 1910.
2 SHEETS—SHEET 2.
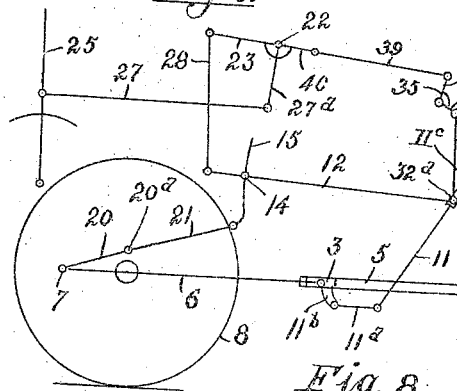
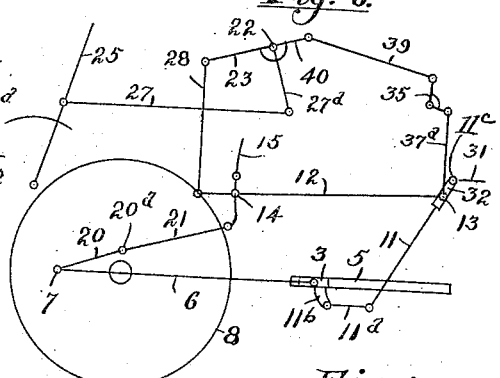
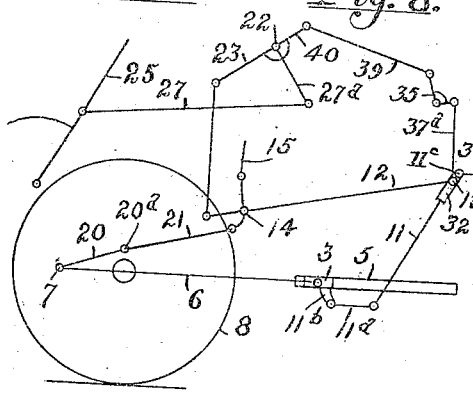
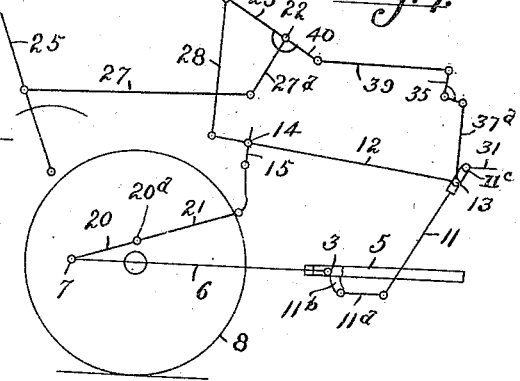
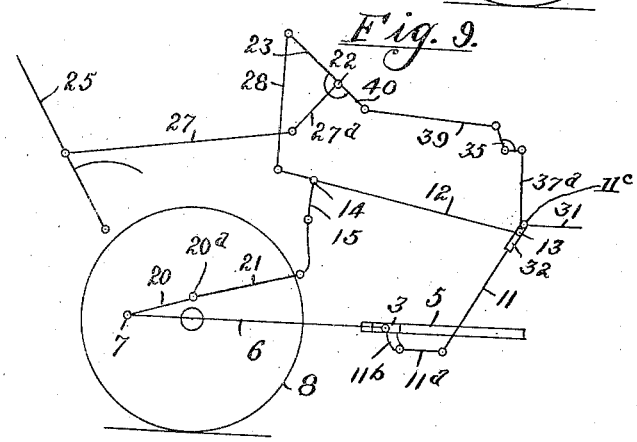
Witnesses
Inventor
William Lynn Davis
By
Atty.

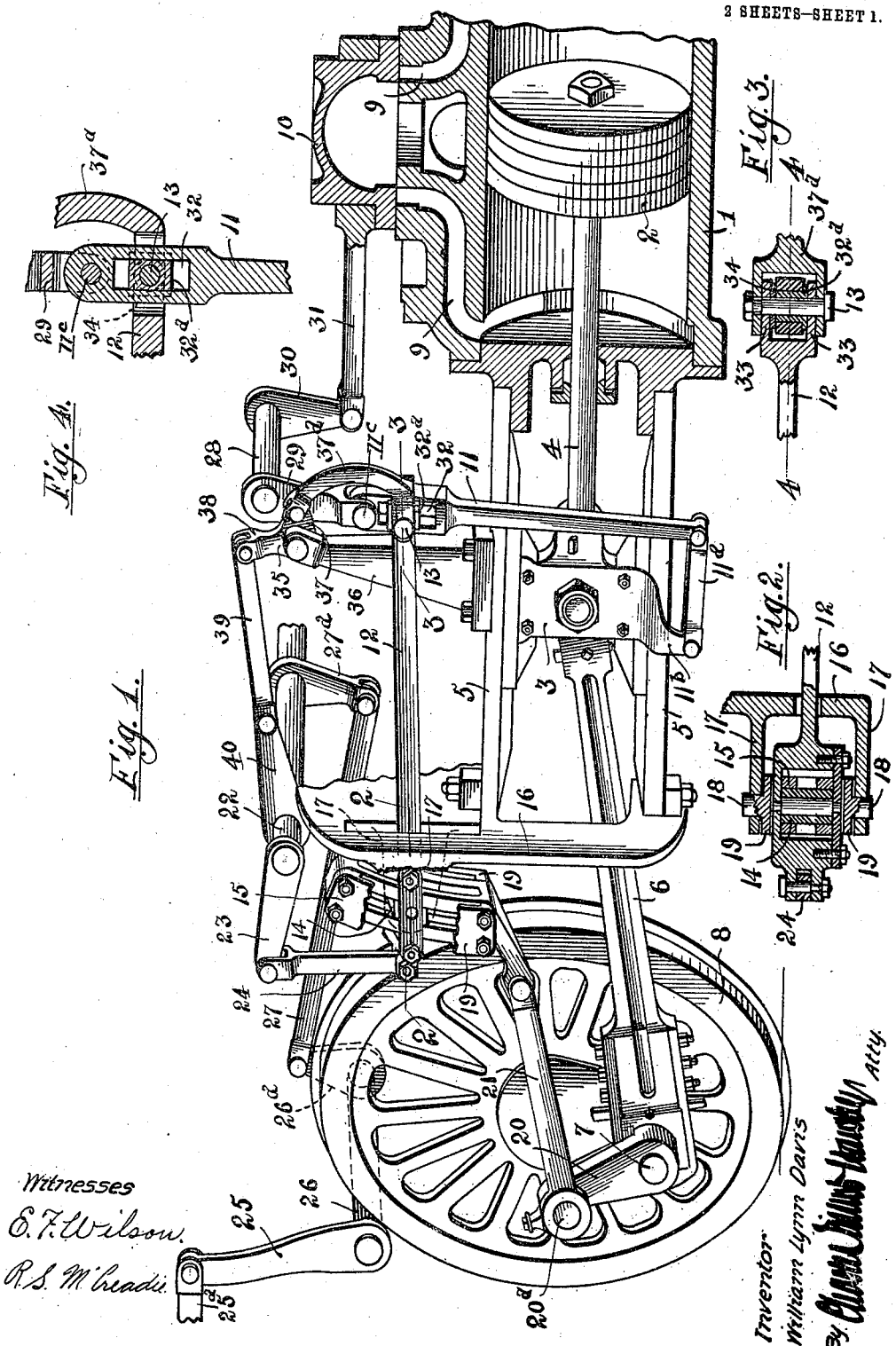

UNITED STATES PATENT OFFICE.

WILLIAM LYNN DAVIS, OF TOPEKA, KANSAS.

VARIABLE-LEAD VALVE-GEAR FOR LOCOMOTIVES.

977,938.  Specification of Letters Patent.  Patented Dec. 6, 1910.

Application filed February 12, 1910. Serial No. 543,620.

*To all whom it may concern:*

Be it known that I, WILLIAM LYNN DAVIS, a citizen of the United States, and resident of Topeka, Kansas, have invented certain new and useful Improvements in Variable-Lead Valve-Gear for Locomotive-Engines, of which the following is a full, true, clear, and exact description, such as will enable others skilled in the art to make and use the same.

My invention relates to improvements in valve gears, and has particular reference to improvements in Walscheart type locomotive valve gears.

The object of my invention is to so improve the construction and operation of Walscheart type locomotive valve gears that the lead of the valve will be automatically altered in inverse proportion to the variation of the cut-off by the adjustment of the reversing lever; and will operate in such manner during both forward and reverse movements of the reversing lever.

My invention consists in a locomotive valve gear having the functions and embodying the features of construction typically indicated and disclosed in the accompanying drawings and detailed description.

The invention will be readily understood by reference to said drawings, in which:

Figure 1 is a diagrammatic perspective view of the principal parts of a locomotive engine, provided with an improved Walscheart valve gear embodying my invention; Figs. 2 and 3 are detail fragmentary horizontal sections on the lines 2—2 and 3—3 respectively of Fig. 1; Fig. 4 is a detailed fragmentary vertical section on the line 4—4 of Fig. 3; and Figs. 5 to 9 inclusive are line diagrams of the valve motion or gear in different operating conditions, the moving members being illustrated by their center lines only, and the connections between moving parts being indicated by arcs of circles.

A locomotive engine of well-known type is illustrated. The parts which are fixed upon the frame of the locomotive are: the engine cylinder, 1, the cross head guides, 5, the frame part, 16, the link brackets, 17, the standard, 36, and the bearings (not shown) for the several rocking shafts, 26, 22 and 28. The piston 2 within the cylinder is connected to the cross head, 3, by the piston rod, 4, and the cross head is joined by the usual connecting rod, 6, to the crank 7, of the driver, or driving wheel, 8. The ports, 9, of the cylinder are controlled by a valve such as the sliding valve, 10, which is actuated by the valve motion about to be described. The valve derives its motion from the return crank, 20, fixed on the crank pin, 7, of the driver, and from the cross head, 3.

31 represents the valve rod.

28 is a rocking shaft adjacent to the rear end of the valve rod, and having two rocking arms, 29 and 30, the latter being connected to the rear end of the valve rod.

The connection of the valve to the cross head is established through the cross head hanger, 11$^b$, the link, 11$^a$ and the lap-and-lead lever, 11, the latter having its upper end pivoted by a pin 11$^c$ to the rocking arm, 29, which, as stated, joins the valve through the medium of rocking shaft, 28, arm, 30, and valve rod, 31.

The connection between the valve and the return crank on the drive wheel comprises the crank pin, 20$^a$, on the return crank 20, the rod, 21, the oscillating, curved link, 15, pivotally fixed on the frame of the engine, the radius rod, 12, the fulcrum pin, 13, and fulcrum block, 32$^a$, from which latter the remainder of the connection is traced through the upper end of the lap-and-lead lever and the parts, 29, 28, 30 and 31. The reciprocating motion of the cross head and the rotary motion of the return crank combine to produce a single lesser movement of the upper end of the combination lever, hence of the valve. The movement of the lower end of the combination lever, 11, is determined by the stroke of the piston and cross head. The movement of the radius rod, 12, is determined by the position which the block, 14, may, at the moment, occupy in the curved link, 15, said link having a definite position on the frame and having a definite oscillation imparted to it by the return crank on the driver. Assuming now that the fulcrum pin, 13, is fixed at a definite point on the combination lever, the movement imparted to the valve will comprise the sum of the swinging movement of the upper end or arm of the combination lever plus the horizontal throw imparted by the link, 15, and radius rod, 12. If the link block, 14, is alined with the trunnions of the links, 15, the only motion upon the valve will be the minor swinging movement of the upper arm of the combination lever, for at such time the radius rod will be stationary.

It will be noted that the outer plates, 19, of the link have trunnions, 18, by which the link is pivoted in the bracket, 17, of the engine frame, and the radius rod is bifurcated at its rear end so that it projects back of the link (see Figs. 1 and 2). The hanger link, 24, is attached to the rear end of the radius rod and represents the reversing lever of the locomotive. In these drawings the connecting mechanism between the radius rod and the reversing lever, 25, comprises the link, 24, the rocker arm, 23, the fixed rocking shaft, 22, the rocker arm, 27ª, the rod, 27, the rocker arm, 26ª, the fixed rocking shaft, 26, the arm, 25, and the reach rod, 25ª.

In the diagrammatic figures the rod, 27, is represented as though connected directly to the reversing lever, 25. The proportion of the parts are such that when the reversing lever is in vertical position the link block will be held at the center of the link. Movement of the reversing lever in either direction from the vertical will shift the block toward one end of the link, and the latter being in constant oscillation will impart to the radius rod a movement proportional to the distance of the link block from the center of the link. A reversal of the reversing lever from one side of the vertical position to the other causes the block to be shifted to the opposite end of the link and reverses the reciprocation of the valve with respect to the piston, causing a reversal in the movement of the engine.

In thus far describing the operation of the valve motion I have referred to the fulcrum or motion juncture pin, 13, as occupying a fixed position on the combination lever, but this is not the case. Instead, the combination lever is provided with a vertical slot, 32, extending downwardly from a point adjacent to the upper pivot and containing the fulcrum block, 32ª, in which the pin, 13, is placed. A bell crank, 35, is mounted on the upper end of the standard, 36, and its lower arm, 37, is connected to the fulcrum pin, 13, (and radius rod) by a curved lifting link, 37ª, the lower end of which is in the form of a yoke fastened to the ends of the fulcrum pin, 13. It will now be obvious that by moving the bell crank, 35, the fulcrum pin, 13, and the forward end of the radius rod may be raised and lowered on the combination lever, such movement varies the distance between the centers of the lever pivots, 13, and 11ᶜ. In other words, such movement varies the relative lengths of the upper and lower arms of the combination lever and alters the degree of swinging movement of the upper arm of the combination lever. By lowering the fulcrum pin, 13, the throw or movement of the valve is increased, and by raising the fulcrum pin the movement of the valve may be diminished. It is desirable to add to the stroke of the valve in this manner when the motion of the radius is reduced by the approach of the link block to the center of the link, and reversely it is desirable to subtract from the motion of the valve in proportion to the movement of the link block toward either end of the link, in order that the lead shall be increased as the cut-off is decreased and vice versa. As a means of lifting or adjusting the juncture fulcrum of the combination lever and radius rod I employ a rocker arm, 40, on the shaft, 22, and a link, 39, which extends from the end of said arm to the upright arm, 38, of the bell crank, 35. It will now be understood that the link block, 14, at one end of the radius rod and the motion juncture fulcrum, 13, at the other end of the radius rod receive vertical adjustment from the same source, namely, the rocker shaft, 22; in other words, the reversing lever which said shaft represents, because connected thereto. Opposite movements of the rock shaft and arm, 23, produce reversals of the valve, but both movements of the rock shaft produce the same effect upon the motion juncture fulcrum, 13. This is brought about by so placing the arm, 40, on the shaft, 22, that it will make a straight line with the link, 39, when the reversing lever and rock shaft are in neutral positions.

In practice I construct the parts so that the motion juncture pin is close to the lower end of the slot, 32, in the combination lever at times when the link block is in central position. A movement of the link block in either direction from its central position in the link being occasioned by the rocking of shaft, 22, causes the elevation of the fulcrum, 13, and consequent reduction of valve lead. This being brought about by the swinging of the toggle, comprising the arm, 40, and link, 39.

I desire that it be understood that the valve motion herein shown is merely typical of my invention and that with types of Walscheart valve geared engines it is desirable and necessary to considerably modify the structure herein shown. For example, where it is necessary to place the fulcrum juncture pin, 13, above the connection of the lap-and-lead lever, 11, to the valve stem, 31, it will be necessary to reverse the action and position of the bell crank lever, 35, so that as the reverse lever, 25, is moved from this central position to increase the cut-off the fulcrum, 13, will be lowered instead of raised, as in the present instance. These and other modifications may be made without departing from the spirit of my invention.

Having thus described my invention, I claim as new and desire to secure by Letters Patent:—

1. The herein described improvement in valve gears for locomotive engines, comprising an oscillating link and means whereby the same is oscillated by the rotation of the driving wheel of the locomotive, in combination with the link block in, and shiftable from end to end of, said link, a combination lap-and-lead lever having one end connected with the engine cross-head for actuation thereby and having its other end operatively connected to the valve rod, a fulcrum block shiftable longitudinally upon said lever, a radius rod extending from said link block to said fulcrum block for communicating the motion of said link to said combination lever, a reversing lever and a system of levers connecting the same with both said blocks and adapted to move said fulcrum block toward the valve rod connection of the combination lever when the link block is moved from its central position toward either end of said link, and vice versa.

2. The herein described improvement in valve gears for locomotive engines comprising an oscillating link pivotally mounted or trunnioned upon the engine frame in combination with means for oscillating said link from the driving wheel of the locomotive, a link block in, and shiftable from end to end of, said link, a combination lap-and-lead lever having one end connected with the engine cross head for swinging reciprocation thereby and having its other end operatively connected with the valve rod of the engine, a fulcrum shiftable longitudinally upon said lever, a radius rod extending from said link block to said fulcrum and adapted to communicate motion from the link to said combination lever, a reversing lever or member and a system of levers operable thereby to shift said link block and said fulcrum simultaneously to decrease the valve-lap as the valve cut-off is increased, and vice versa.

3. The herein described improvement in valve gears for locomotive engines comprising an oscillating link pivoted or trunnioned on the frame of the engine, a means for oscillating said link by the rotation of the driving wheel of the locomotive, in combination with a link block shiftable in said link, a reversing lever for shifting said block in said link, a combination lap-and-lead lever having one end connected with and actuated by the engine cross head and having its other end operatively connected with the valve rod of the engine, a radius rod connecting said link block to said combination lever at a point adjacent to the valve rod connection of the latter and mechanism connected with and actuated by said reverse lever for shifting the connection of said radius rod and combination lever in inversed conformity to the movement imparted to said link block by said reverse lever.

4. The herein described improvement in valve gears for locomotive engines comprising an oscillating link trunnioned upon the frame of the engine and means for oscillating said link from the driving wheel of the locomotive, in combination with a link block in, and shiftable from end to end of, said link, a combination lap-and-lead lever having one end connected to and actuated by the engine cross head and having its other end operatively connected with the valve rod of the engine, a radius rod extending from said link block to a pivotal point on said combination lever adjacent to the valve rod connection of the latter, a reversing lever and a system of levers connecting the same with both ends of said radius rod and operable to shift the link block in said link and, proportionally to the movement of said block away from its central position in the link, diminish the distance between said valve rod connection and said pivotal point of the radius rod and combination lever.

5. The herein described improvement in valve gears for locomotive engines comprising an oscillating link trunnioned on the engine frame in combination with means for oscillating said link from the driving wheel of the locomotive, a link block shiftable in said link, a combination lap-and-lead lever having one end connected with the engine cross head and having its other end operatively connected with the valve rod, and a fulcrum block longitudinally shiftable on said lever, a radius rod connecting said link block and said fulcrum block, a reversing lever coupled to said link block and adapted to shift said link block from end to end of said link, a bell crank coupled to said fulcrum block and adapted to move said fulcrum block toward and from the valve rod connection of said lever, a shaft coupled to and adapted to be partially rotated by movement of said reversing lever, a rocker arm extending therefrom and a coupling link joining the free end of said rocker arm to said bell crank, said rocker arm and coupling lever being constructed to form a straight line when the reversing lever is in its neutral position.

In testimony whereof, I have hereunto set my hand, this 7th day of February, 1910, in the presence of two subscribing witnesses.

WILLIAM LYNN DAVIS.

Witnesses:
 JOHN H. LINN,
 LULU KELLY.